Figure 1:
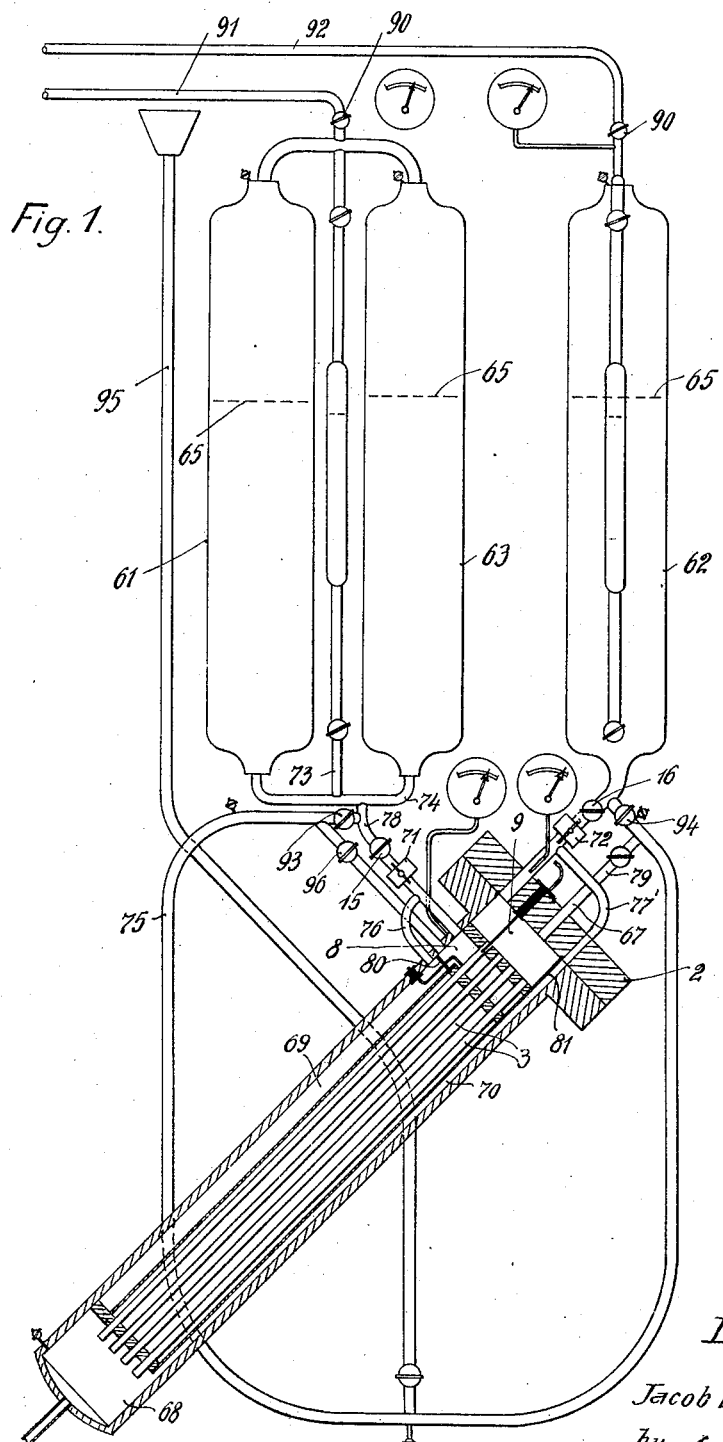

Feb. 7, 1933.   J. E. NOEGGERATH   1,896,718
ELECTRODE VESSEL FOR ELECTROLYTIC APPARATUS
Original Filed Feb. 23, 1926   2 Sheets-Sheet 1

Inventor:
Jacob Emil Noeggerath
by
Atty.

Feb. 7, 1933.   J. E. NOEGGERATH   1,896,718
ELECTRODE VESSEL FOR ELECTROLYTIC APPARATUS
Original Filed Feb. 23, 1926   2 Sheets-Sheet 2
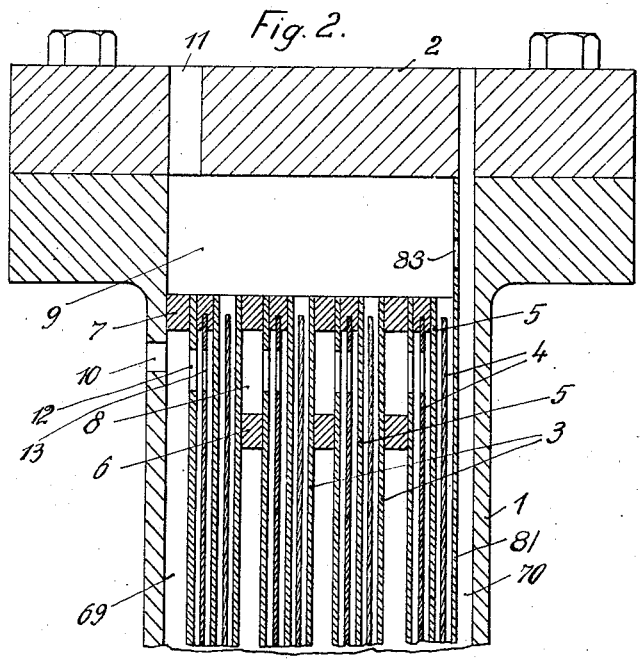
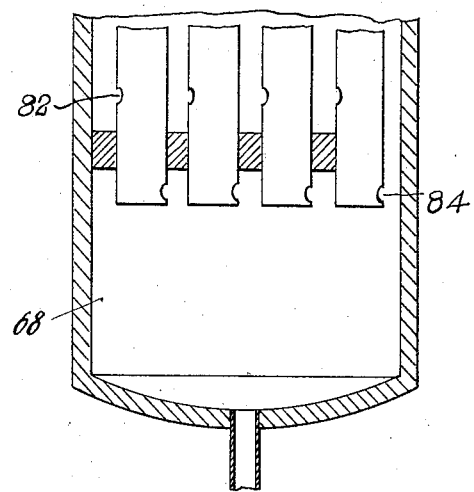
Inventor:
Jacob Emil Noeggerath
by
Atty.

Patented Feb. 7, 1933

1,896,718

UNITED STATES PATENT OFFICE

JACOB EMIL NOEGGERATH, OF BERLIN, GERMANY

ELECTRODE VESSEL FOR ELECTROLYTIC APPARATUS

Original application filed February 23, 1926, Serial No. 89,928, and in Germany December 19, 1924. Divided and this application filed August 21, 1928, Serial No. 301,017. Renewed June 9, 1932.

My invention refers to electrolytic apparatus, more especially for the production of hydrogen and oxygen and its particular object is to provide vessels which are specially adapted for use in connection with such apparatus. This case is a division of U. S. application Serial No. 89,928, filed Feb. 23, 1926.

More especially in the cases where an electrolytic decomposition shall be effected under pressure, for instance for the production of hydrogen and oxygen, the electrolyte spaces are preferably arranged in vessels, some of which contain electrodes (electrode spaces), while others do not contain electrodes (electrolyte spaces proper). This arrangement involves a reduction of the masses and renders it possible to easily equalize the pressure and to provide a particular security, this being far more important in view of the high pressure resulting in the decomposition than in systems operated under atmospheric pressure.

Preferably the electrolyte spaces proper are disposed above the electrode spaces. The electrolyte spaces proper can be partly filled with gas; however, if they are filled with electrolyte altogether, they may be connected with suitable gas-collecting spaces.

I prefer employing vessels containing a plurality of complete electrode cells or connected with different electrode cells. I further prefer employing cells, the length of which is considerably greater, at least five to ten times and even up to thirty times greater than their width and height. The single cells may be tubular or trough-shaped and may have any desired cross-section. They may be open at certain points or may be provided with apertures, and the cells may also be disposed in concentric arrangement. In certain cases I make use of additional electrolyte spaces provided in the electrode vessels themselves. I may, for instance, form the electrolyte spaces and the gas spaces from pressure-resistive tubes, which may form part of the structure of a building, such as for instance a tower. I thus obtain a very advantageous form of an apparatus for storing energy in situ, that is without requiring any portable steel containers and these apparatus can preferably be operated in connection with power engines of any suitable kind, such as boilers, gas engines and the like operated with the gases obtained by electrolytic decomposition and mounted in close vicinity to the apparatus.

In the drawings affixed to this specification and forming part thereof an apparatus embodying my invention is illustrated diagrammatically by way of example.

In the drawings,

Fig. 1 is a diagram, partly in axial section, of the pressure-resistive vessel with a number of cells arranged therein and the gas-collecting chambers connected therewith, while Fig. 2 is an enlarged axial section of the pressure-resistive vessel and the cells.

Referring to the drawings, 1 is the pressure-resistive vessel, which is here shown to have the form of a thick-walled steel tube closed at one end by the bottom, at the other end by the cover 2, fixed in place by means of screw bolts. In this vessel the length of which greatly exceeds its diameter, are disposed a plurality of tubular cells 3, each cell containing a pair of electrodes 4 and a partition 5 separating the electrodes. The tubular cells 3 are fixed in two intermediate walls 6 and 7 extending transversely to the vessel 1 in the vicinity of the cover, a space 8 being left between the two walls for collecting one of the two gases, for instance the hydrogen developed in all the cells. Between the upper wall 7 and the cover 2 is left another collecting chamber 9 for the gas, for instance oxygen, developed in the other halves of the cells. From the collecting chamber 8 the hydrogen can escape through a boring 10 in the wall of the vessel 1, the oxygen from the collecting chamber 9 through an opening 11 in the cover. In order that the hydrogen be enabled to escape sideways from the upper part of the cells, the wall of each cell has an opening 12, each negative electrode an opening 13.

On the electrodes being supplied with current, oxygen is developed in the right hand half of the cell tubes and this oxygen escapes through the opening 11 in the cover into the chamber 62 which is filled with electrolyte up to the dotted line 65. At the same time this part of the electrolyte is caused to rise under the action of heat and the rising gas bubbles. Through openings 83 in the partition 81 it enters the space 70 and the bottom chamber 68, whereupon it returns through bottom openings 84 of the tubular cells 3 into the right hand halves of these tubes. The oxygen itself escapes from the chamber 9 through the check valve 72 into the collecting vessel 62. If desired, the gas may be conducted directly into the chamber 62 without entering the valve 72, a by-pass being then provided.

Hydrogen is developed in the left hand side of the tubular cells 3 and enters the collecting chamber 8. The part of the electrolyte, in which the hydrogen is developed, rises also under the action of the gas bubbles and the heat, enters the collecting chamber 8 and flows through the chamber 69 downwardly and through lateral holes 82 back into the left hand portion of the tubular cells. The hydrogen gas itself rises through the check valves 71, which may again be provided with a small by-pass, and through tube 74 into the two vessels 61 and 63, to be there collected under pressure. In proportion to the quantity of gases produced the gases will be compressed above the electrolyte level marker 65, until the desired pressure has been attained, the valves 90 above the collecting vessels being closed. Now the valves 15 and 16 in the pipes are closed while the valves 90 are opened, allowing the gases to escape through the pipes 91, 92 into portable steel containers. Owing to the fact that the valves 15 and 16 have preferably been closed, any difference of pressure, which may arise during the tapping of the gases, will have no effect on the electrolyzer vessel proper.

In order to obtain a full equalization, the two valves 93 in the equalizing pipe 75 and the valve 94 at the right hand end of this pipe are opened, allowing the pressure to be equalized. The same valves are then closed and are reopened only when it is desired to introduce water, preferably under pressure, into the apparatus through the feed pipe 95.

The pipe 67 serves the purpose of allowing the oxygen to rise, which may be left in the electrolyte circulating in the space 70. The pipe 76 serves the same purpose with regard to the hydrogen rising in the electrolyte space 69. The pipes 96 and 79 serve for placing the electrode spaces of different polarity in communication with the equalizing pipe. The check valves 71 and 72 serve for preventing unexpected differences of pressure, which may arise during operation, to be communicated to the collecting vessels 61, 62, 63.

I wish it to be understood that I do not desire to be limited to the exact details of construction shown and described for obvious modifications will occur to a person skilled in the art.

I claim:—

1. Pressure electrolytic apparatus comprising a presure resistive vessel, the length of which is considerably greater than any dimension transverse to the length, and a plurality of cells in said vessel arranged longitudinally thereof, the length of each of said cells being considerably greater than any dimension transverse to its length.

2. Pressure electrolytic apparatus comprising a tubular pressure resistive vessel, the length of which is considerably greater than any dimension transverse to the length, and a plurality of tubular cells in said vessel arranged longitudinally thereof, the length of each of said cells being considerably greater than any dimension transverse to its length.

In testimony whereof I affix my signature.

JACOB EMIL NOEGGERATH.